United States Patent
Oren et al.

(10) Patent No.: US 11,451,283 B2
(45) Date of Patent: Sep. 20, 2022

(54) CHANNEL SMOOTHING WITH TX BEAMFORMING

(71) Applicant: Avago Technologies International Sales Pte. Limited, Singapore (SG)

(72) Inventors: Roy Oren, Magshimim (IL); Daniel Stopler, Holon (IL); Shimon Benjo, Petah-Tiqwa (IL)

(73) Assignee: Avago Technologies International Sales Pte. Limited, Singapore (SG)

(*) Notice: Subject to any disclaimer, the term of this patent is extended or adjusted under 35 U.S.C. 154(b) by 0 days.

(21) Appl. No.: 17/306,826

(22) Filed: May 3, 2021

(65) Prior Publication Data

US 2021/0367653 A1 Nov. 25, 2021

Related U.S. Application Data

(60) Provisional application No. 63/028,473, filed on May 21, 2020.

(51) Int. Cl.
*H04B 7/06* (2006.01)
(52) U.S. Cl.
CPC ......... *H04B 7/0634* (2013.01); *H04B 7/0617* (2013.01); *H04B 7/0641* (2013.01)

(58) Field of Classification Search
CPC .................................................. H04B 7/0634
USPC ........................................................ 375/267
See application file for complete search history.

(56) References Cited

U.S. PATENT DOCUMENTS

| | | | |
|---|---|---|---|
| 2008/0108310 A1* | 5/2008 | Tong | H04W 72/042 455/69 |
| 2011/0122016 A1* | 5/2011 | Lomes | H01Q 3/267 342/174 |
| 2017/0063438 A1* | 3/2017 | Baik | H04B 7/0617 |
| 2019/0097709 A1* | 3/2019 | Joetten | H04B 7/0634 |
| 2020/0212984 A1* | 7/2020 | Fellhauer | H04L 25/0202 |

\* cited by examiner

*Primary Examiner* — Lihong Yu
(74) *Attorney, Agent, or Firm* — BakerHostetler (57) ABSTRACT

A method for channel smoothing with transmit beamforming includes transmitting, by a first device, a non-data-packet (NDP) frame to a second device. The method also includes receiving, by the second device, the NDP frame and transmitting a compressed report to the first device. The method further includes receiving, by the first device, the compressed report and deriving a first beamforming matrix from the compressed report. A second beamforming matrix is generated employing a processing known to the second device, and a data frame is transmitted to the second device using the second beamforming matrix.

20 Claims, 4 Drawing Sheets

CHANNEL SMOOTHING WITH TX BEAMFORMING

TECHNICAL FIELD

The present description relates generally to wireless communication and, in particular, to channel smoothing with transmit (TX) beamforming.

BACKGROUND

Wireless receivers are normally required to estimate the wireless channel between a transmitter and the receiver for proper equalization of the received signal from the transmitter. The wireless channel is highly complex, and in general it is both frequency- and time-selective. With multiple antennas at the transmitter, the space-selectivity also plays a role. Channel estimation is performed by employing long-training field (LTF) symbols transmitted by the transmitter. The LTF symbols received by the receiver are generally accompanied by noise. When the transmitter has multiple antennas, beamforming is used to focus the signal transmitted from the transmitter (beamformer) toward the receiver (beamformee). Beamforming is a signal processing technique for spatial filtering used in antenna arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity. For proper beamforming, the beamformer needs to receive a report from the beamformee. Based on the received report from the beamformee, the beamformer is able to construct a steering matrix, which is used to focus the transmitted energy toward the beamformee.

BRIEF DESCRIPTION OF THE DRAWINGS

Certain features of the subject technology are set forth in the appended claims. However, for purposes of explanation, several embodiments of the subject technology are set forth in the following figures.

FIG. 3 is a block diagram illustrating an example of a current system and process for channel smoothing with TX beamforming.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to methods and systems for channel smoothing with transmit (TX) beamforming. The disclosed scheme enables better mitigation of the noise that accompanies the long-training field (LTF) symbols. The subject technology provides a technique for the beamformer to leverage a report received from the beamformee to enable the beamformee to estimate the channel in a way that better mitigates the noise on the LTF symbols. The disclosed technique restricts the processing that the beamformer is allowed to perform on the received report such that the beamformee is able to reconstruct the steering matrix and estimate the pre-beamforming channel. The pre-beamforming channel is shorter than the post-beamforming channel, and therefore the beamformee is left with fewer parameters to estimate. It should be noted that the better channel estimation of the subject technology improves the system error rate for a given signal-to-noise ratio (SNR) or shortens the training symbol to improve spectral efficiency.

Channel smoothing accuracy is critical to link performance, especially for the high modulation and coding scheme (MCS). It is known that applying smoothing to channel estimation can yield several dB of gain. Beamformer implementations may ensure smoothness of the post-beamforming channel at a level sufficient for interpolation from 1× and/or 2×-LTF to full payload fast-Fourier transform (FFT) symbol size (i.e., a normal size of a symbol), but not enough for a full smoothing gain. The 1× and 2×-LTF refer to ¼ of FFT size and ½ of FFT size, respectively. In order to be able to smooth the channel in a high MCS scenario, it is required that the energy from all impulse responses of the time domain channels between all space-time streams and all receive chain inputs be confined to a small fraction of the symbol length.

The physical channel, i.e., the pre-beamforming channel, is confined to a small fraction of the orthogonal frequency division multiplexing (OFDM) symbol duration, e.g., the 11nB channel is confined to 200 ns and the 802.11nD protocol channel is confined to 400 ns. However, the post-beamforming channel no longer has this property. Even when the beamformer maintains smoothness of the post-beamforming channel, most stations (STAs) will refrain from applying smoothing, and hence their performance (and the performance of the entire system) will be degraded. In subject disclosure, a scheme is described that allows the receiver to benefit from smoothing for all cases, excluding multiuser-multi-input-multi-output (MU-MIMO) of the 802.11be protocol.

Figure 1:
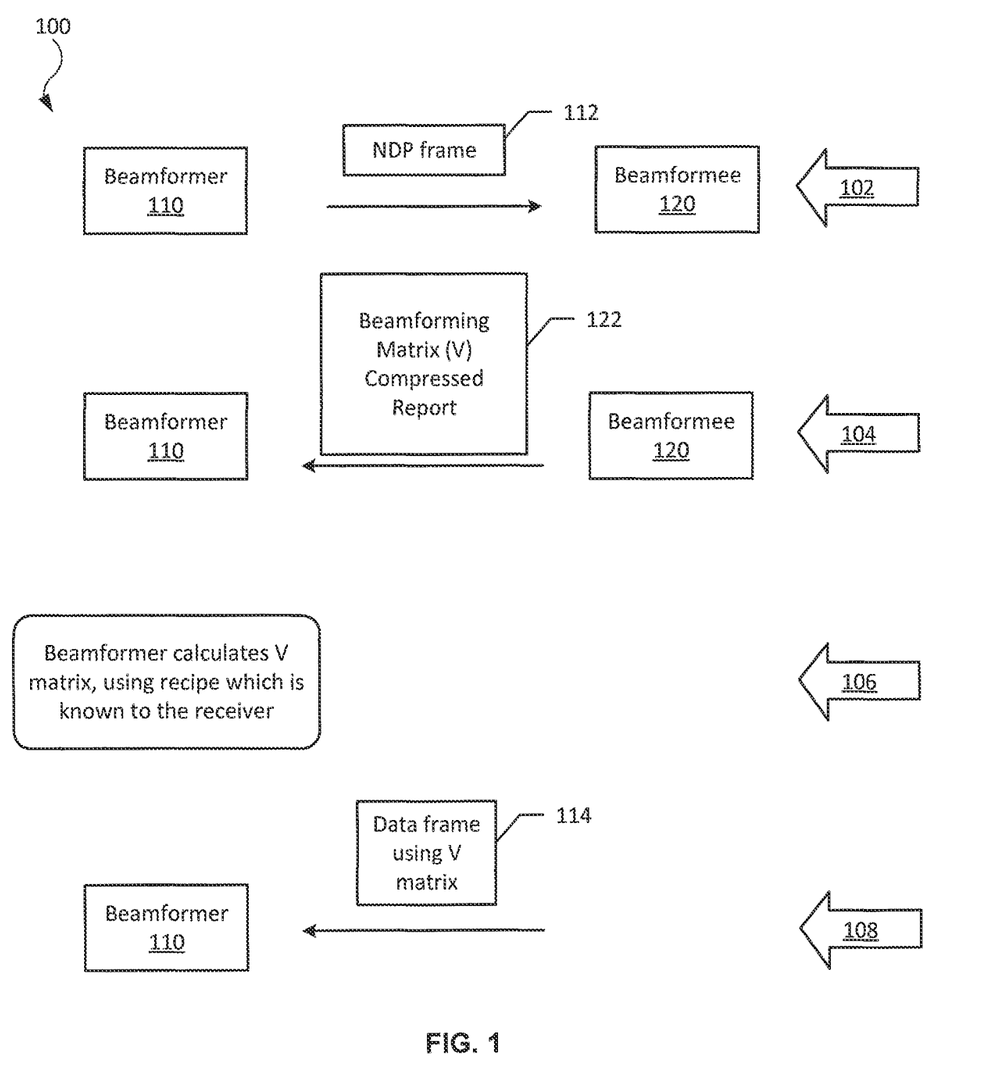
FIG. 1 is a block diagram illustrating an example of a system and process for transmit (TX) beamforming, according to various aspects of the subject technology.

FIG. 1 is a block diagram illustrating an example of a system and process 100 for channel estimation with transmit (TX) beamforming, according to various aspects of the subject technology. The system and process 100 shows a process channel estimation with TX beamforming in a wireless communication system including a first device (beamformer) 110 and a second device (beamformee) 120. In some implementations, the first device 110 can be a multiantenna access point and the second device 120 can be a station, such as a wireless communication device, for example, a smartphone, a smartwatch, a tablet or any handheld wireless communication device. The process starts at step 102 where the first device 110 sends a non-data-packet (NDP) frame 112 to the second device 120. The second device 120 employs the received NDP frame 112 to estimate the wireless communication channel between the first device 110 and the second device 120 (hereinafter, channel). The result of the channel estimation by the second device 120 is transmitted in step 104 to the first device 110 as a compressed report 122. The compression used by the second device 120 can be a standard compression. The compressed report 122 includes a beamforming matrix that can be used for beam steering by the first device 110. The beamforming matrix can be, for example, a two-dimensional matrix or a three-dimensional matrix of the transmit antenna, space-time stream, and subcarrier with complex values. The second device 120 is capable of optimizing the beamforming matrix based on the channel estimation performed in step 102.

In step 106, the first device 110 applies proper processing to the compressed report 122 to derive the optimized beamforming matrix V (hereinafter, matrix V). The processing used by the first device 110 to derive the matrix V is known to the second device 120 (the receiver). The first device 110 reconstructs the matrix V by uncompressing the compressed report 122 received from the second device 120, for example, by applying the reciprocal of the compression used on the matrix V, to create the angles used in the compressed report 122, as is done in explicit feedback beamforming. The explicit transmit beamforming is an advanced signal-processing technique used in multiple-antenna communications. With this technique, the first device 110 can utilize information about the communication link with wireless client devices such as the second device 120 to improve signal transmission to those devices. Explicit beamforming provides better reception, range, and throughput while minimizing interference. The IEEE 802.11ac protocol has standardized explicit beamforming technology so that routers, access points, and wireless clients from all conforming manufacturers can use the technology's full capacity.

The matrix V is used by the first device 110 in single-user multi-input-multi-output (MIMO) mode. The first device 110 can use linear interpolation on the uncompressed matrix V in order to mitigate the grouping of Ng adjacent carriers. Further, the first device 110 is allowed to apply different gains per antenna of its multiple TX antennas. When this mode is applied, the first device 110 does not need to consider the length of the post-beamforming channel, since the first device 110 can reconstruct the matrix V applied, and estimate the short pre-beamforming channel for effective application of smoothing, and then apply the steering matrix on the pre-beamforming channel estimate. For pre-beamforming channel estimation, the second device 120 needs to estimate a number of (T*S) parameters given the number ($N_{FFT}*N_{LTF}$) of observations per RX antenna, where T is the number of TX antennas used by the first device 110 (number of rows in matrix V), S is the temporal spread (length) of the pre-beamforming channel, measured in samples (e.g., 200 ns*80×$10^6$=16 samples) for a 802.11nB protocol channel with 80 MHz bandwidth, $N_{FFT}$ is the discrete Fourier transform (DFT) size used for LTF and $N_{LTF}$ is the number of LTF symbols. Clearly, the number of observations is significantly larger than the number of parameters that the second device 120 needs to estimate the channel, hence processing gain is significant. For example, for the 80 MHz, 802.11nB channel 4×2 system with 2×-LTF, the processing gain is up to about 12 dB.

Even when the pre-beamforming channel is smeared due to analog filters in the transmission path, the processing gain is still significant. Several techniques can be used, for example, the known least squares technique or less expensive approximate and/or iterative solutions, to estimate the T*S parameters of the channel. The complexity of pre-beamforming channel estimation scales according to T*S, where both T and S may be bounded. Most of the required processing may commence once the second device 120 finds the matrix V, when the timing constraint is less critical. To understand the benefits of the subject technology, a currently used system and process is described below.

Figure 2:
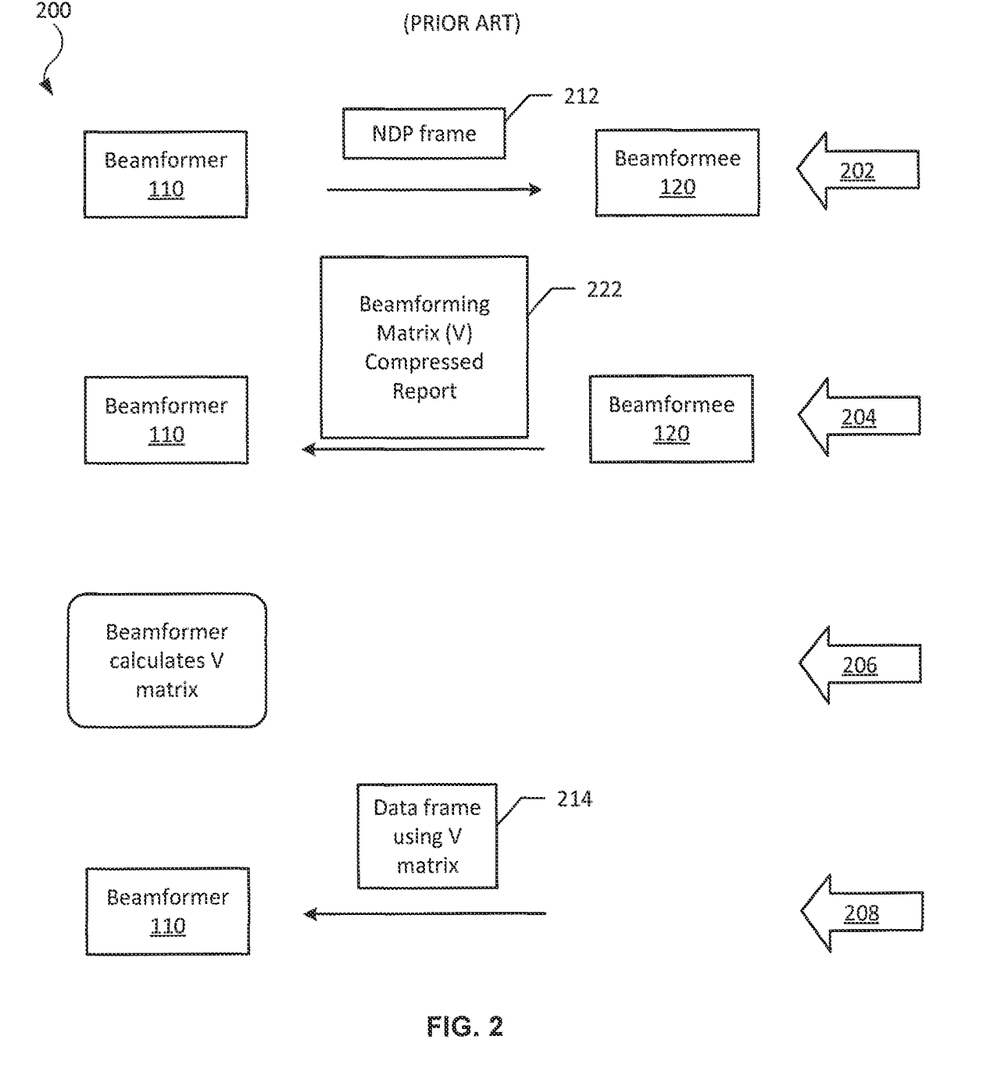
FIG. 2 is a block diagram illustrating an example of a conventional system and process for channel estimation with TX beamforming.

FIG. 2 is a block diagram illustrating an example of a conventional system and process 200 for TX beamforming. The conventional system and process 200 shows a process for channel estimation with known TX beamforming m the wireless communication system of FIG. 1 including the first device 110 and the second device 120. The process starts at step 202, where the first device 110 sends an NDP frame 212 to the second device 120. The second device 120 uses the received. NDP frame 212 to estimate the channel. In step 204, the second device 120 transmits a compressed report 222 to the first device 110. The compressed report includes the matrix V, which is optimized for the channel estimated in step 202, The compression used by the second device 120 can be a standard compression. In step 206, the first device 110 applies proper processing to the compressed report 222 to derive the optimized beamforming matrix V (hereinafter, matrix V), The processing used by the first device 110 to derive the matrix V is unknown to the second device 120 (the receiver). In step 208, the first device 110 uses the V matrix to beamform the transmission of data frames 214 toward the second device 120. It is noted that the matrix V used by the first device 110 to generate the data frames 214 is not confined to the V matrix reported by the second device 120.

Figure 3:
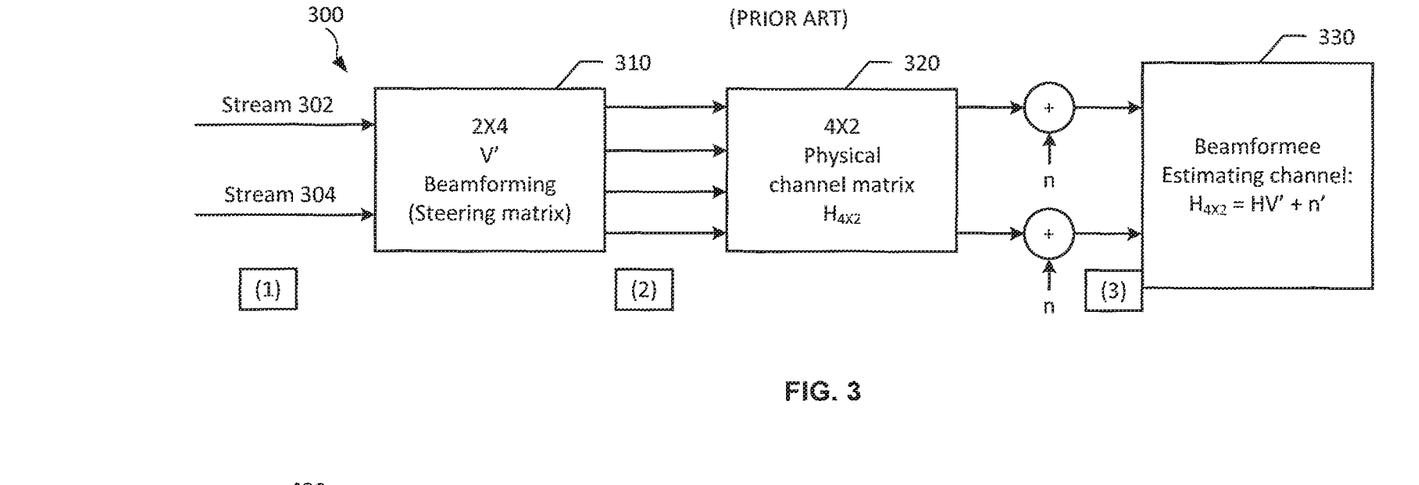
FIG. 3 is a block diagram illustrating an example of a conventional system and process for channel smoothing with TX beamforming.

FIG. 3 is a block diagram illustrating an example of a conventional system and process 300 for channel smoothing with TX beamforming. The conventional system and process 300 involves a beamformer (e.g., first device 110 of FIG. 2) with four antennas and a beamformee (e.g., second device 120 of FIG. 2) with two antennas and two spatial streams 302 and 304, and the process is channel smoothing. During the training symbols, the stream data is known to the receiver (beamformee). In this process, the two streams 302 and 304 are transmitted by the beamformer to the beamformee using the beamforming matrix 310 (V'), which is a 2×4 matrix. The physical channel 320 is represented by a 4×2 physical channel matrix H4×2(hereinafter, H). At point (3) input noise n is added to both of the streams. At operation block 330, the beamformee has to estimate the composite channel, which is a superposition of the physical channel H and the steering matrix V'. The estimated channel includes noise n', which corresponds to the input noise n. In one or more implementations, the beamformee may use the physical channel that was estimated during NDP. In terms of the quality of the channel estimation, this option may not be desirable but can work in static channels.

Figure 4:
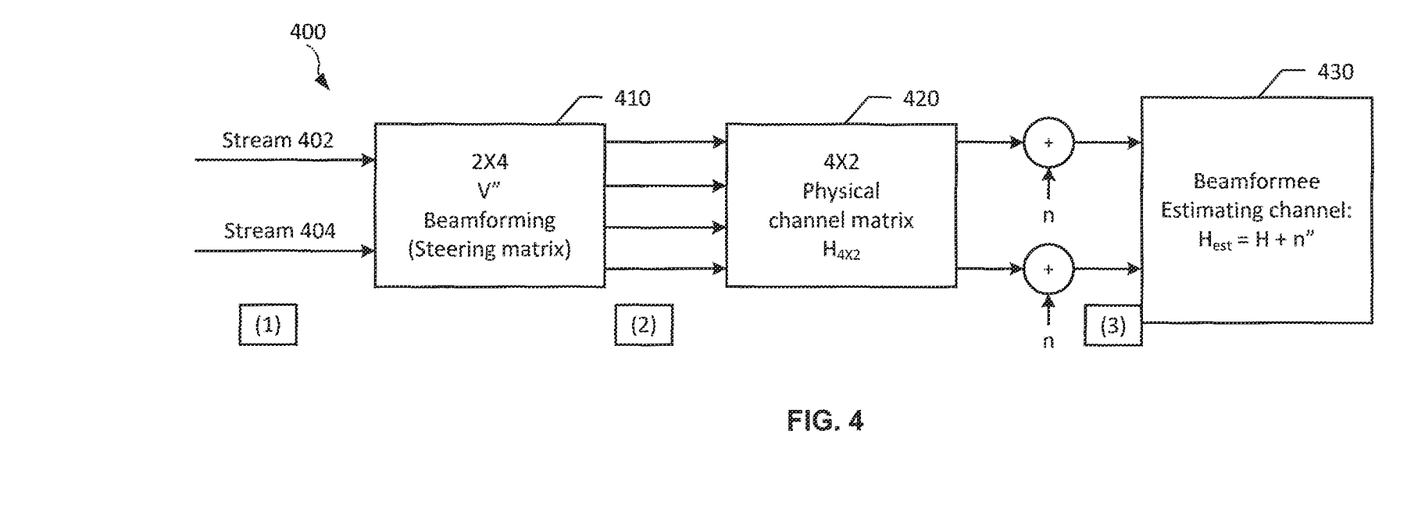
FIG. 4 is a block diagram illustrating an example of a system and process for channel smoothing with TX beamforming, according to various aspects of the subject technology.

FIG. 4 is a block diagram illustrating an example of a system and process 400 for channel smoothing with TX beamforming, according to various aspects of the subject technology. The disclosed system and process 400 similarly involves a beamformer (e.g., first device 110 of FIG. 2) with four antennas and a beamformee (e.g., second device 120 of FIG. 2) with two antennas and two spatial streams 402 and 404, and the process is channel smoothing with beamforming. During the training symbols, the stream data is known to the receiver (beamformee). In this process, the two streams 402 and 404 are transmitted by the beamformer to the beamformee using the beamforming matrix 410 (V"), which is a 2×4 matrix. The physical channel 420 is represented by a 4×2 physical channel matrix H4×2 (hereinafter, H). At point (3) input noise n is added to both of the streams. At operation block 430, the beamformee estimates the channel H, which includes noise n", which corresponds to the input noise n at point (3).

In the disclosed process, the beamformee knows matrix V" (since it knows the compressed report and the recipe used to convert it to V"); therefore, it can reconstruct the signal at point 2 and thus needs to only estimate the physical channel H. Therefore, for the beamformee it is possible to take advantage of the fact that the physical channel H has a relatively short time support. This in turn enables the beamformee to estimate the physical channel H, which is not possible without this assumption when the number of received (RX) antennas $N_r$ is smaller than the number of TX antennas Nt. The beamformee has to smoothen the resulting estimated channel, thus the resulting noise n" in the channel estimation has to be of a lower magnitude than n' in order to yield improved demodulation performance.

In an example scenario, for a 80 MHz system, the beamformee samples the signal at 80 MHz; thus each sample spans 12.5 nsec (1/80 MHz), and therefore the value of Ts is equal to 12.5 nsec. The number of TX antennas is 4 ($N_{Tx}$=4), the LTF symbol size in samples is 512 ($N_{LTF}$=512) and the physical channel spread is 200 nsec; therefore, $T_{au}$ in samples is 16 (200 nsec/12.5 nsec=16). The number of observations the beamformee can use to estimate the channel is $N_{LFT}$ (=512), and the number of parameters it has to estimate is $N_{Tx}*T_{au}$ (=64). Thus, the number of parameters is lower than the number of observations, and the 8× ratio in this example allows for processing gain. The beamformee may use algorithms known in the art such as minimum mean square error (MMSE), least mean square (LMS) or least squares (LS) to estimate the parameters from said observations and benefit from said processing gain, Since matrix V" is known to the beamformee already in step 204 of FIG. 2, it may precompute sections of the algorithm before step 208 of FIG. 2, which is usually more time-critical (channel estimate has to be ready in time for payload reception). When the channel changes slowly over time, the receiver may also use the channel estimated during step 202 of FIG. 2. Note that the NDP frame 212 usually includes more training symbols. The beamformee may use this channel estimate instead or to aid the channel estimate during step 208. It is worth emphasizing that the difference between the conventional process of FIG. 3 and the disclosed process of FIG. 4 is that in the conventional process, H*V' does not represents the quality of the physical channel, namely, spread cannot be confined to some short interval. The disclosed technology provides a better channel estimation to improve the system error rate for a given signal-to-noise ratio (SNR). In other words, the process of the subject technology can shorten the training symbol to improve spectral efficiency. In conclusion, using pre-beamforming channel estimation enables a proficient receiver to gain about 2 dB in sensitivity, can open the door to higher constellations and enables using 1x-LTF to improve spectral efficiency. Complexity of such a receiver (beamformee) is not substantially greater than a receiver that employs channel smoothing in non-beamforming transmissions, and the requirement from the beamformer is straightforward. In some implementations, schemes may be used to make the LTF signals during data packet redundant time. For example, the second device 120 can use the physical channel estimated during NDP and then during DP only apply the known V matrix. In one or more implementations, the LTF symbols can be omitted when a shorter packet preamble is desired to improve efficiency.

Figure 5:
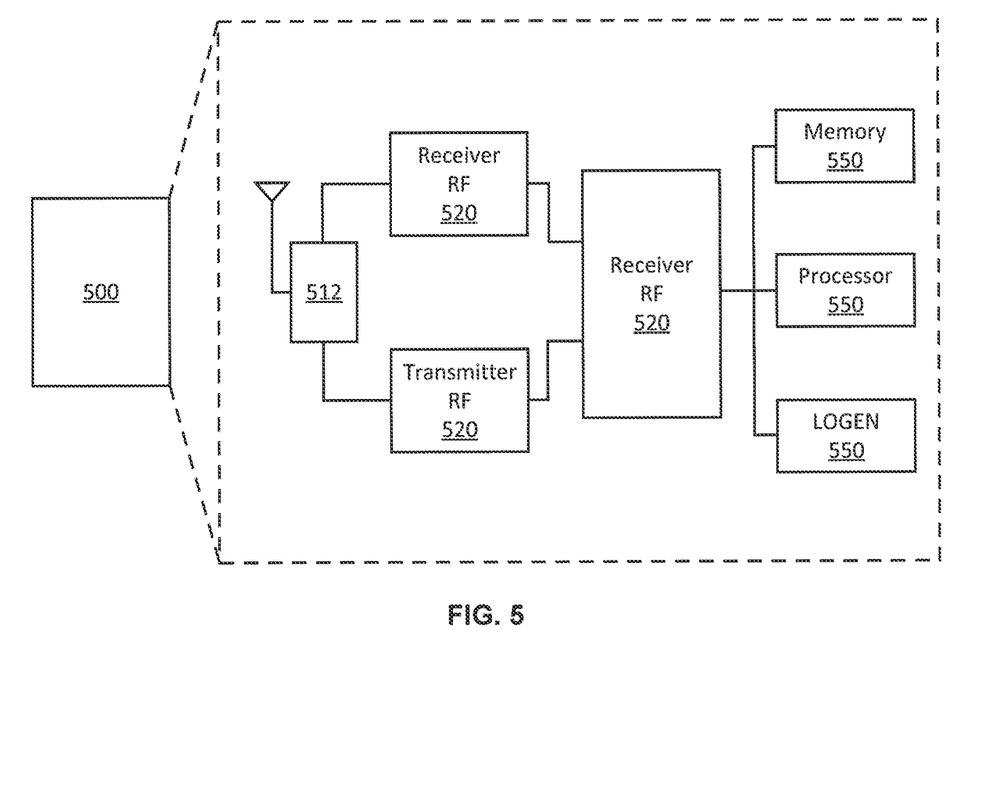
FIG. 5 is a block diagram illustrating a wireless communication device within which one or more aspects of the subject technology can be implemented.

FIG. 5 is a block diagram illustrating a wireless communication device 500 within which one or more aspects of the subject technology can be implemented. In one or more implementations, the wireless communication device 500 can be a smartphone, a tablet, a laptop or any wireless mobile communication device. The wireless communication device 500 may comprise an RF antenna 510, a duplexer 512, a receiver 520, a transmitter 530, a baseband-processing block 540, a memory 550, a processor 560, a LO generator (LOGEN) 570, and a display 580. In various embodiments of the subject technology, one or more of the blocks represented in FIG. 5 may be integrated on one or more semiconductor substrates. For example, the blocks 520-570 may be realized in a single chip or a single system on a chip or may be realized in a multichip chipset.

The receiver 520 may comprise suitable logic circuitry and/or code that may be operable to receive and process signals from the RF antenna 510. The receiver 520 may, for example, be operable to amplify and/or downconvert received wireless signals. In various embodiments of the subject technology, the receiver 520 may be operable to cancel noise in received signals and may be linear over a wide range of frequencies. In this manner, the receiver 520 may be suitable for receiving signals in accordance with a variety of wireless standards, such as Wi-Fi, WiMAX, Bluetooth, and various cellular standards. In various embodiments of the subject technology, the receiver 520 may not use any saw-tooth acoustic wave filters and few or no off-chip discrete components such as large capacitors and inductors.

The transmitter 530 may comprise suitable logic circuitry and/or code that may be operable to process and transmit signals from the RF antenna 510. The transmitter 530 may, for example, be operable to upconvert baseband signals to RF signals and amplify RF signals. In various embodiments of the subject technology, the transmitter 530 may be operable to upconvert and amplify baseband signals processed in accordance with a variety of wireless standards. Examples of such standards may include Wi-Fi, WiMAX, Bluetooth, and various cellular standards. In various embodiments of the subject technology, the transmitter 530 may be operable to provide signals for further amplification by one or more PAs. The transmitter 530 may use DPD to correct nonlinearities of the one or more PAs and the DPD verification and TX nonlinearity estimation system of the subject technology to improve signal quality of the PAs.

The duplexer 512 may provide isolation in the transmit band to avoid saturating the receiver 520 or damaging parts of the receiver 520, and to relax one or more design requirements of the receiver 520. Furthermore, the duplexer 512 may attenuate the noise in the receive band. The duplexer 512 may be operable in multiple frequency bands of various wireless standards.

The baseband-processing block 540 may comprise suitable logic, circuitry, interfaces, and/or code that may be operable to perform processing of baseband signals. The baseband-processing block 540 may, for example, analyze received signals and generate control and/or feedback signals for configuring various components of the wireless communication device 500, such as the receiver 520. The baseband-processing block 540 may be operable to encode, decode, transcode, modulate, demodulate, encrypt, decrypt, scramble, descramble, and/or otherwise process data in accordance with one or more wireless standards. In one or more implementations, the baseband-processing block 540 may perform the functionalities of the block diagrams of FIGS. 1 and 3.

The processor 560 may comprise suitable logic, circuitry, and/or code that may enable processing data and/or controlling operations of the wireless communication device 500. In this regard, the processor 560 may be enabled to provide control signals to various other portions of the wireless communication device 500. The processor 560 may also control the transfer of data between or among various portions of the wireless communication device 500. Additionally, the processor 560 may enable implementation of an operating system or otherwise execute code to manage the operations of the wireless communication device 500. In one or more implementations, the processor 560 may perform some of the functionalities of the block diagrams of FIGS. 1 and 3.

The memory 550 may comprise suitable logic, circuitry, and/or code that may enable storage of various types of information such as received data, generated data, code, and/or configuration information. The memory 550 may comprise, for example, random-access memory (RAM), read-only-memory (ROM), flash, and/or magnetic storage. In various embodiments of the subject technology, information stored in the memory 550 may be utilized for configuring the receiver 520 and/or the baseband-processing block 540. In some implementations, the memory 550 may store image information from processed and/or unprocessed fingerprint images of the under-display fingerprint-sensing device of the subject technology. The memory 550 may also include one or more databases of reference fingerprints that can be used to identify and/or authenticate a person associated with the fingerprint.

The LOGEN 570 may comprise suitable logic, circuitry, interfaces, and/or code that may be operable to generate one or more oscillating signals of one or more frequencies. The LOGEN 570 may be operable to generate digital and/or analog signals. In this manner, the LOGEN 570 may be operable to generate one or more clock signals and/or sinusoidal signals. Characteristics of the oscillating signals such as the frequency and duty cycle may be determined based on one or more control signals from, for example, the processor 560 and/or the baseband-processing block 540.

In operation, the processor 560 may configure the various components of the wireless communication device 500 based on a wireless standard according to which it is desired to receive signals. Wireless signals may be received via the RF antenna 510, amplified, and then downconverted by the receiver 520. The baseband-processing block 540 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device 500, data to be stored to the memory 550, and/or information affecting and/or enabling operation of the wireless communication device 500. The baseband-processing block 540 may modulate, encode, and perform other processing on audio, video, and/or control signals to be transmitted by the transmitter 530 in accordance with various wireless standards.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the term "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" and "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject but rather are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as "an aspect," "the aspect," "another aspect," "some aspects," "one or more aspects," "an implementation," "the implementation," "another implementation," "some implementations," "one or more implementations," "an embodiment," "the embodiment," "another embodiment," "some embodiments," "one or more embodiments," "a configuration," "the configuration," "another configuration," "some configurations," "one or more configurations," "the subject technology," "the disclosure," "the present disclosure," and other variations thereof and alike are for convenience and do not imply that a disclosure relating to such phrase(s) is essential to the subject technology or that such disclosure applies to all configurations of the subject technology. A disclosure relating to such phrase (s) may apply to all configurations, or one or more configurations. A disclosure relating to such phrase(s) may provide one or more examples. A phrase such as "an aspect" or "some aspects" may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for channel smoothing with transmit beamforming, the method comprising:
   transmitting a non-data-packet (NDP) frame to a device, wherein the NDP frame causes the device to estimate a channel, the estimated channel based on a physical channel and input noise;
   receiving, from the device, a compressed report;
   deriving a first beamforming matrix and the estimated channel from the compressed report;
   generating, based on the first beamforming matrix and the estimated channel, a second beamforming matrix by a process known to the device; and
   transmitting, using the second beamforming matrix, a data frame to the device.

2. The method of claim 1, wherein the estimated channel comprises a communication channel with the device.

3. The method of claim 2, wherein the first beamforming matrix is configured for use with beam steering based on the compressed report.

4. The method of claim 3, further comprising uncompressing the first beamforming matrix using a reciprocal process of a compression used by the device.

5. The method of claim 4, further comprising:
   applying a linear interpolation on the uncompressed first beamforming matrix; and
   mitigating, based on the linear interpolation, grouping of Ng adjacent carriers.

6. The method of claim 1, further comprising applying, while transmitting the data frame, different gains for different antennas.

7. The method of claim 1, further generating the second beamforming matrix comprises reconstructing the second beamforming matrix based on the compressed report.

8. The method of claim 7, wherein the data frame comprises one or more data streams that causes the device to estimate a pre-beamforming channel.

9. The method of claim 8, further comprising applying the reconstructed second beamforming matrix to the estimated pre-beamforming channel.

10. The method of claim 1, wherein the compressed report comprises a steering matrix used to focus energy on the device.

11. A semiconductor substrate, comprising:
    transmitter circuitry;
    receiver circuitry;
    memory circuitry; and
    processing circuitry configured to execute code stored on the memory circuitry that causes the processing circuitry to;
    transmit, using the transmitter circuitry, a non-data-packet (NDP) frame to a device, wherein the NDP frame causes the device to estimate a channel, the estimated channel based on a physical channel and input noise;
    receive, using the receiver circuitry, a compressed report from the device;
    derive a first beamforming matrix and the estimated channel from the compressed report;
    generate, based on the first beamforming matrix and the estimated channel, a second beamforming matrix by a process known to the device; and
    transmit, using the second beamforming matrix, a data frame to the device.

12. The semiconductor substrate of claim 11, wherein the processing circuitry is further configured to execute code to uncompress the first beamforming matrix using a reciprocal process of a compression used by the device.

13. The semiconductor substrate of claim 12, wherein the processing circuitry is further configured to execute code to:
    apply a linear interpolation on the uncompressed first beamforming matrix; and
    mitigate, based on the linear interpolation, grouping of Ng adjacent carriers.

14. The semiconductor substrate of claim 11, wherein the processing circuitry is further configured to execute code to apply, while transmitting the data frame, different gains for a plurality of antennas.

15. The semiconductor substrate of claim 11, wherein the processing circuitry is further configured to execute code to reconstruct the second beamforming matrix by estimating the physical channel between the device and one or more of the receiver circuitry and the transmitter circuitry.

16. The semiconductor substrate of claim 15, wherein the processing circuitry is further configured to execute code to estimate a pre-beamforming channel.

17. The semiconductor substrate of claim 16, wherein the processing circuitry is further configured to execute code to apply the reconstructed second beamforming matrix to the estimated pre-beamforming channel.

18. A multiantenna access point comprising:
processing circuitry configured to:
  transmit a non-data-packet (NDP) frame to a wireless communication device, wherein the NDP frame causes the wireless communication device to estimate a channel, the estimated channel based on a physical channel and input noise;
  receive, from the wireless communication device, a compressed report;
  derive a beamforming matrix and the estimated channel from the compressed report;
  generate, based on the beamforming matrix and the estimated channel, a V matrix employing a processing that is known to the wireless communication device; and
  transmit, using the V matrix, a data frame to the wireless communication device.

19. The multiantenna access point of claim 18, wherein the processing circuitry is configured to:
  reconstruct the V matrix based on a knowledge of the processing used by the wireless communication device;
  estimate a pre-beamforming channel; and
  apply the reconstructed V matrix to the estimated pre-beamforming channel.

20. The multiantenna access point of claim 19, wherein the reconstructed V comprises beam steering that is applied on the estimated pre-beamforming channel.

* * * * *

UNITED STATES PATENT AND TRADEMARK OFFICE
CERTIFICATE OF CORRECTION

PATENT NO. : 11,451,283 B2
APPLICATION NO. : 17/306826
DATED : September 20, 2022
INVENTOR(S) : Roy Oren et al.

It is certified that error appears in the above-identified patent and that said Letters Patent is hereby corrected as shown below:

In the Claims

Column 10, Line 35 Claim 11: Replace "to;" with "to:";

Column 12, Line 16 Claim 20: Insert --matrix-- after "the reconstructed V".

Signed and Sealed this
Eighteenth Day of April, 2023

*Katherine Kelly Vidal*

Katherine Kelly Vidal
*Director of the United States Patent and Trademark Office*